US006929360B2

(12) United States Patent
Jones

(10) Patent No.: US 6,929,360 B2
(45) Date of Patent: Aug. 16, 2005

(54) PRINTER SOLID INK STICK REMOVAL ACCESS FEATURE

(75) Inventor: Brent R. Jones, Tualatin, OR (US)

(73) Assignee: Xerox Corporation, Stamford, CT (US)

( * ) Notice: Subject to any disclaimer, the term of this patent is extended or adjusted under 35 U.S.C. 154(b) by 245 days.

(21) Appl. No.: 10/368,808

(22) Filed: Feb. 14, 2003

(65) Prior Publication Data

US 2004/0160498 A1 Aug. 19, 2004

(51) Int. Cl.[7] .............................. B41J 2/175; B41J 2/17; G01D 11/00

(52) U.S. Cl. .............................................. 347/88; 347/99

(58) Field of Search .............................. 347/88, 84, 85, 347/99, 95

(56) References Cited

U.S. PATENT DOCUMENTS

| | | | | |
|---|---|---|---|---|
| 5,455,604 A | | 10/1995 | Adams et al. | 346/138 |
| 5,510,821 A | * | 4/1996 | Jones et al. | 347/88 |
| 5,734,402 A | | 3/1998 | Rousseau et al. | 347/88 |
| 5,805,191 A | | 9/1998 | Jones et al. | 347/103 |
| 5,861,903 A | | 1/1999 | Crawford et al. | 347/88 |
| 6,056,394 A | * | 5/2000 | Rousseau et al. | 347/88 |
| 6,530,655 B2 | | 3/2003 | Jones et al. | 347/88 |

OTHER PUBLICATIONS

U.S. Appl. No. 10/135,085, filed on Apr. 29, 2002, entitled "Multiple Segment Keying for Solid Ink Stick Feed," by Brent R. Jones et al.

U.S. Appl. No. 10/135,078, filed on Apr. 29, 2002, entitled "Guide for Solid Ink Stick Feed," by Brent R. Jones et al.

U.S. Appl. No. 10/159,883, filed on May 30, 2002, entitled "Load and Feed Apparatus for Solid Ink," by Brent R. Jones.

* cited by examiner

*Primary Examiner*—Lamson Nguyen
*Assistant Examiner*—Leonard Liang
(74) *Attorney, Agent, or Firm*—David J. Arthur

(57) ABSTRACT

A feature allows for removing an ink stick from an ink feed channel, through the keyed opening for that shape of ink stick. In a keyed key plate opening, a clearance area between the key plate opening and the outer perimeter of the ink stick provides access through which a removal tool can be inserted alongside an ink stick in the channel. In an example, the clearance area is provided by an outwardly directed section of the perimeter of the key plate opening. In a particular implementation, the edge key plate opening is chamfered across the thickness of the key plate, except for a small portion of the perimeter of the key plate opening, which has a straight edge. The end of the removal tool has a surface to engage the ink stick, so that pressing the removal tool against the ink stick, and drawing the removal tool back through the clearance area pulls the ink stick through the key plate opening.

16 Claims, 11 Drawing Sheets

FIG. 13
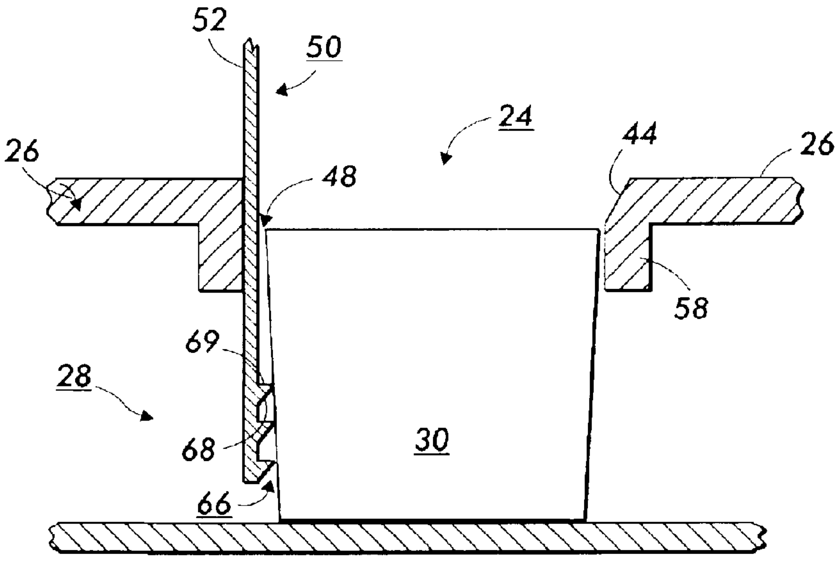
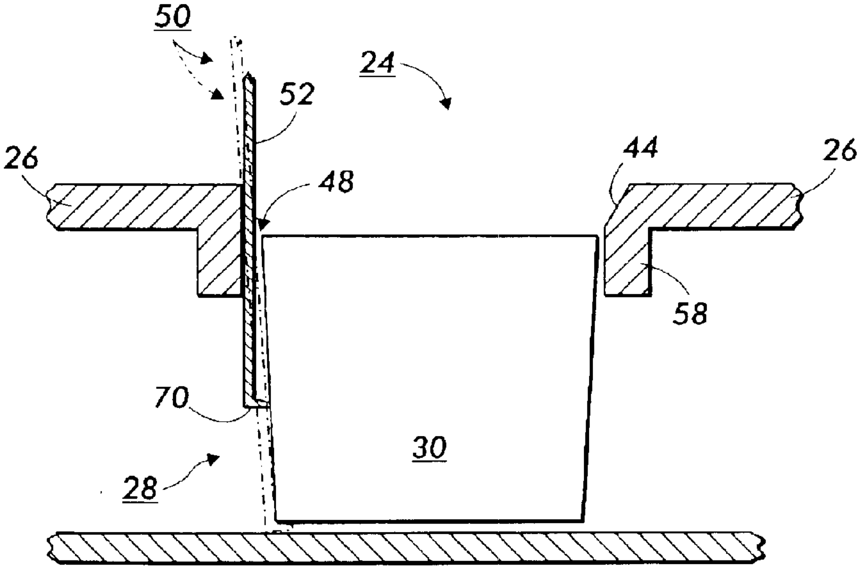
FIG. 14

FIG. 15
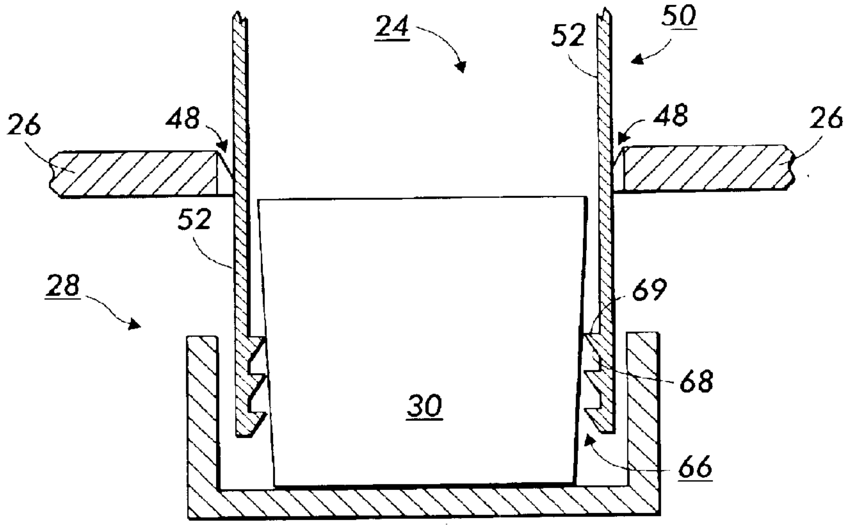
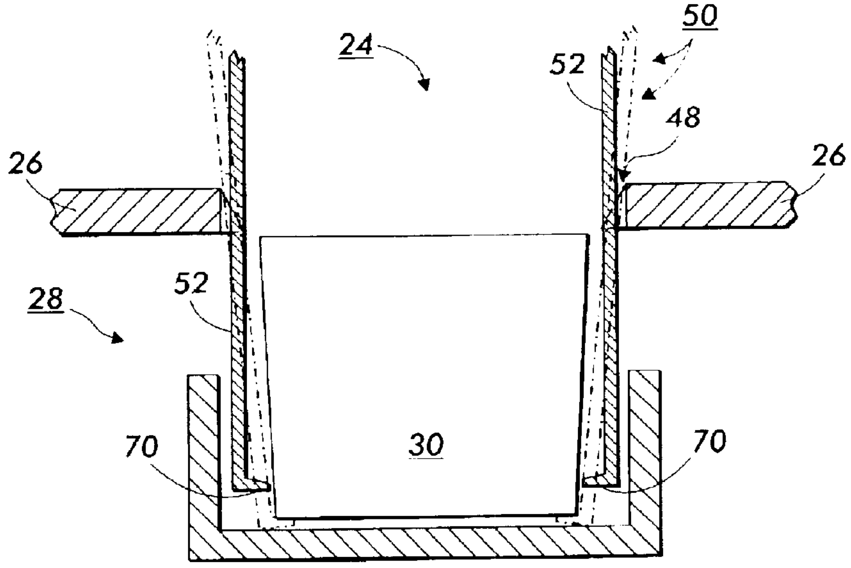
FIG. 16

FIG. 18
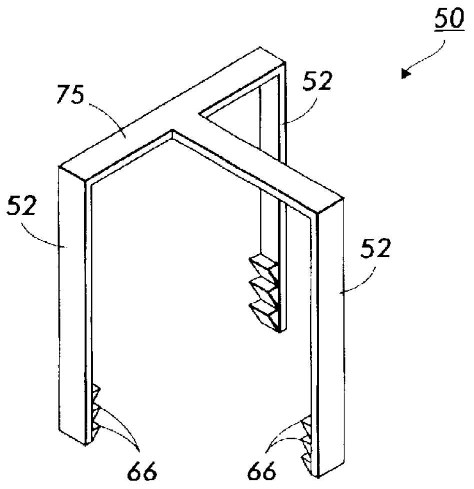
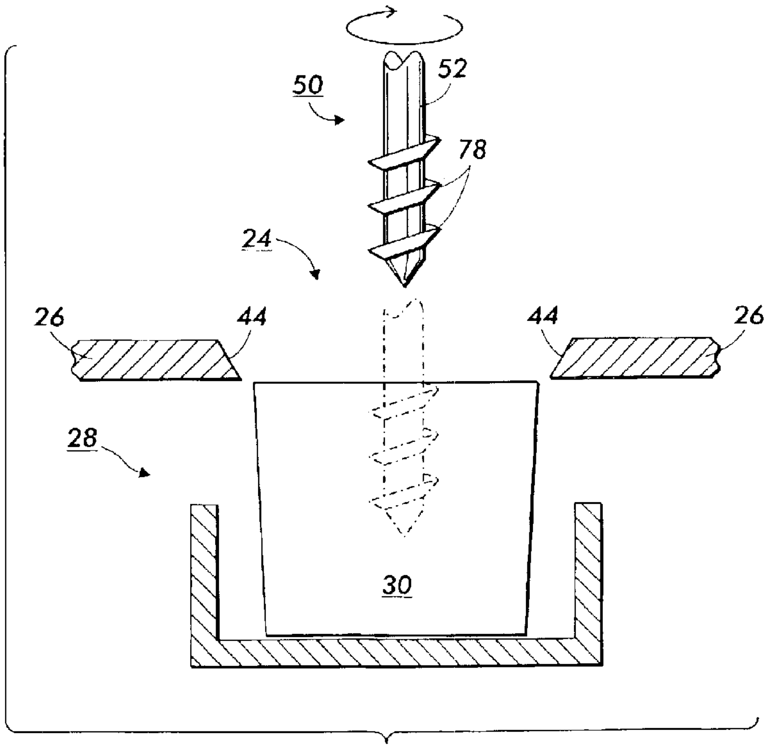
FIG. 19

PRINTER SOLID INK STICK REMOVAL ACCESS FEATURE

CROSS-REFERENCE TO RELATED APPLICATIONS

Reference is made to the following commonly-assigned copending U.S. patent applications: Ser. No. 10/135,085, filed on Apr. 29, 2002, entitled "Multiple Segment Keying for Solid Ink Stick Feed," by Brent R. Jones et al.; Ser. No. 10/135,078, filed on Apr. 29, 2002, entitled "Guide for Solid Ink Stick Feed," by Brent R. Jones et al.; and Ser. No. 10/159,883, filed on May 30, 2002, entitled "Load and Feed Apparatus for Solid Ink," by Brent R. Jones; the disclosures of which are incorporated by reference into this application.

BACKGROUND

The present invention relates generally to phase change ink printers, and the apparatus and method for feeding ink into the printer, and particularly relates to key plate openings for feeding solid ink sticks into the printer.

Ink jet printers eject ink onto an image receiving medium, such as paper or an image drum, in controlled patterns of closely spaced dots that form an image. To form color images, multiple arrays of ink jet channels are used, with each array being supplied ink of a different color from an associated ink supply. Both thermal-type ink jet print heads, which eject a drop by heating the ink to form a bubble, and impulse-type ink jet print heads, which eject a drop by compressing a chamber, are common.

Solid ink or phase change ink printers conventionally receive ink in a solid form and convert the ink to a liquid form for jetting onto the image receiving medium. The printer receives the solid ink either as pellets or as ink sticks in a feed channel. With solid ink sticks, the solid ink sticks are either gravity fed or spring loaded through the feed channel toward a heater plate. The heater plate melts the solid ink into its liquid form. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

The present invention provides a feature for removing an ink stick from a feed channel of a solid ink phase change ink printer.

An ink stick feed system incorporating an aspect of the invention includes a channel for conveying ink sticks to a melt plate, and a key plate substantially covering at least a portion of the channel, and an ink stick. The key plate has a key plate opening through the key plate to permit ink sticks having a particular perimeter shape to pass through the key plate into the channel. Access is provided in a clearance area between the key plate opening and an ink stick positioned in the key plate opening. The clearance area between the ink stick and the key plate opening is for removing the ink stick from the ink delivery channel through the key plate opening. In one example, the key plate opening has substantially the same perimeter shape as the ink stick perimeter, except that at least one section of the key plate opening has an outwardly directed clearance area. The outwardly directed clearance area provides an access opening for inserting a removal tool into the channel to engage a portion of an ink stick in the channel that is aligned with the key plate opening.

A key plate assembly incorporating an aspect of the invention includes a key plate with a key plate opening through it. The key plate has two major surfaces. The key plate opening has a particular perimeter shape at one of the surfaces of the key plate, and an enlarged version of that perimeter shape at the other surface of the key plate. At least one section of the key plate opening at the first surface of the key plate, with the smaller version of the perimeter shape, has an outwardly directed clearance area. A removal tool has at least one leg that has a cross section smaller than the clearance area, so that the removal tool leg can be inserted through the clearance area to engage in an ink stick feed channel a portion of an ink stick that is aligned with the key plate opening A method of removing an ink stick from a feed channel includes positioning the ink stick in the ink feed channel adjacent a keyed opening through a key plate that substantially covers the feed channel. The keyed opening has a perimeter shape substantially the same as the perimeter shape of the ink stick. A removal tool is inserted through a clearance area in the perimeter of the keyed opening until the removal tool is alongside a portion of the ink stick. The removal tool engages the portion of the ink stick, so that removing the removal tool from the clearance area while continuing to engage the ink stick causes the ink stick to pass through the keyed opening.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various figures of the drawings. The drawings, briefly described below, are not to scale.

FIG. 13 is a simplified cross-sectional view of a feed channel showing an ink stick and one embodiment of an ink stick removal tool present.

FIG. 14 is a simplified cross-sectional view of a feed channel showing an ink stick and another embodiment of an ink stick removal tool present.

FIG. 15 is a simplified cross-sectional view of a feed channel showing an ink stick and yet another embodiment of an ink stick removal tool present.

FIG. 16 is a simplified cross-sectional view of a feed channel showing an ink stick and a different embodiment of an ink stick removal tool present.

FIG. 18 is a perspective view of a different multiple-legged ink stick removal tool.

FIG. 19 is a simplified cross-sectional view of a feed channel showing an ink stick and yet a different embodiment of an ink stick removal tool present.

DETAILED DESCRIPTION

In the following detailed description, numeric ranges are provided for various aspects of the embodiments described. These recited ranges are examples only, and are not intended to limit the scope of the claims hereof. In addition, a number of materials are identified as suitable for various facets of the embodiments. These recited materials are exemplary, and are not intended to limit the scope of the claims hereof. In addition, the figures are not drawn to scale for ease of understanding the exemplary implementations.

Figure 1:
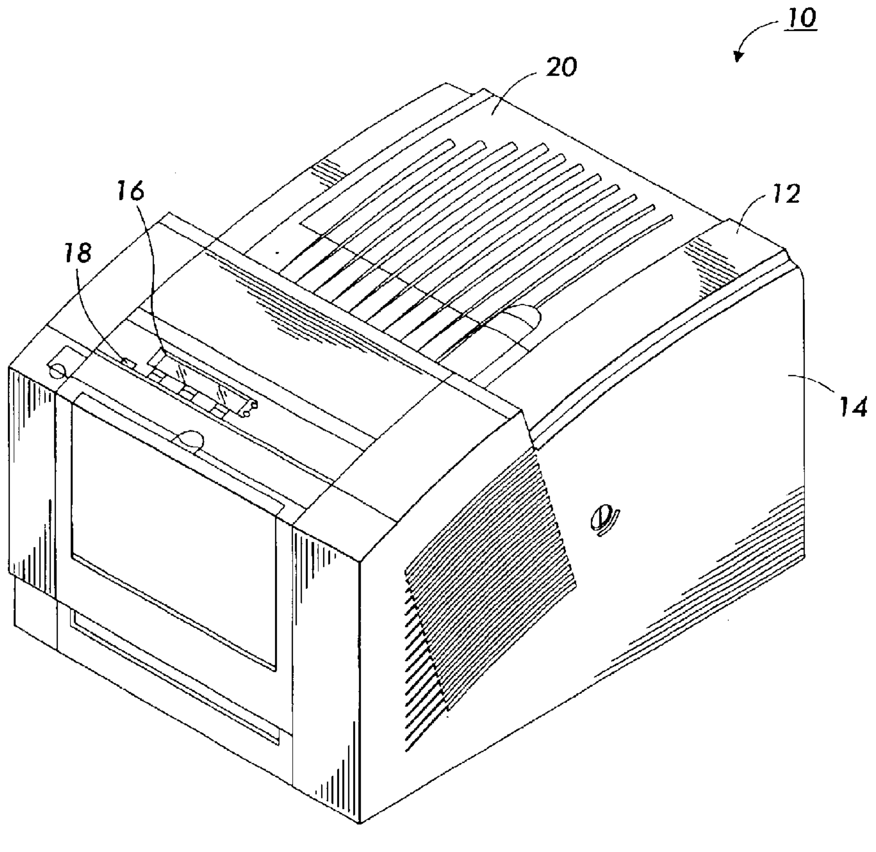
FIG. 1 is a perspective view of a phase change printer with the printer ink access cover closed.
Figure 2:
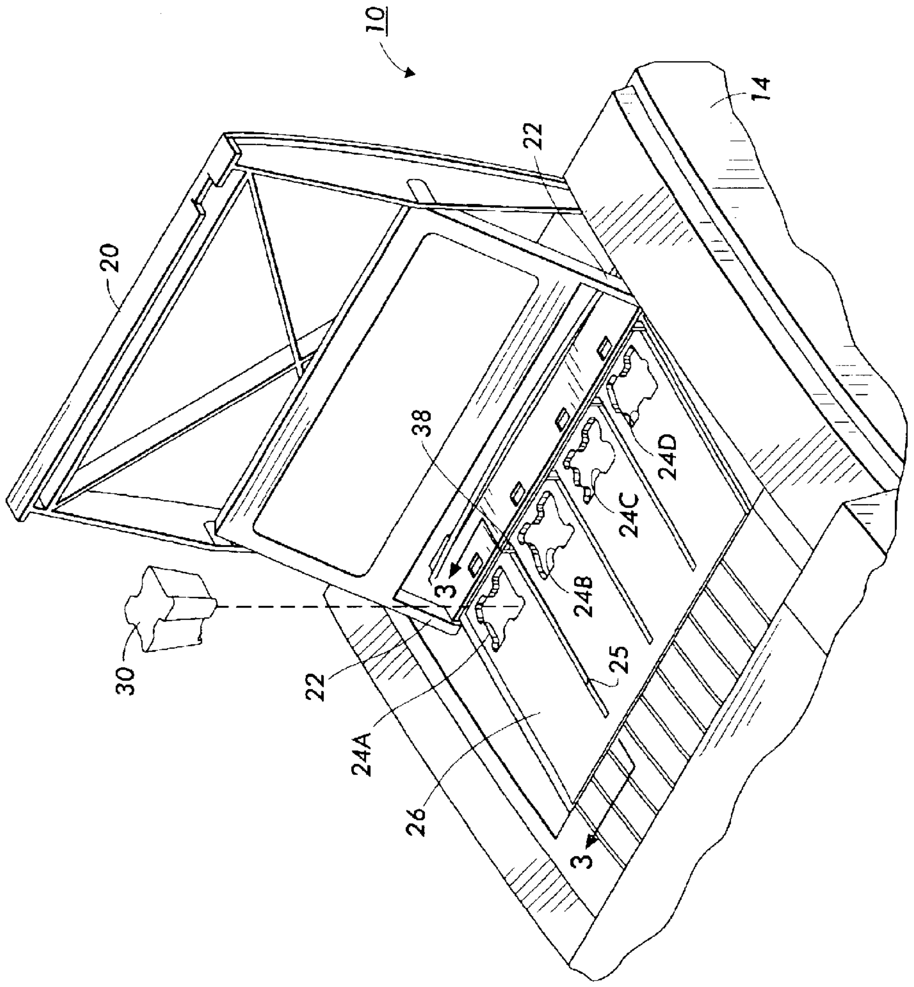
FIG. 2 is an enlarged partial top perspective view of the phase change printer with the ink access cover open, showing a key plate covering the ink feed channels, and a solid ink stick in position to be loaded through a key plate opening into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. Such a printing mechanism is described in U.S. Pat. No. 5,805,191, entitled Surface Application System, to Jones et al, and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

In the particular printer shown, the ink access cover 20 is attached to an ink load linkage element 22 so that when the printer ink access cover 20 is raised, the ink load linkage 22 slides and pivots to an ink load position. An exemplary interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24. Each keyed opening 24A, 24B, 24C, 24D provides access to an insertion end of one of several individual feed channels 28 of the solid ink feed system (see FIGS. 3 and 4).

Figure 3:
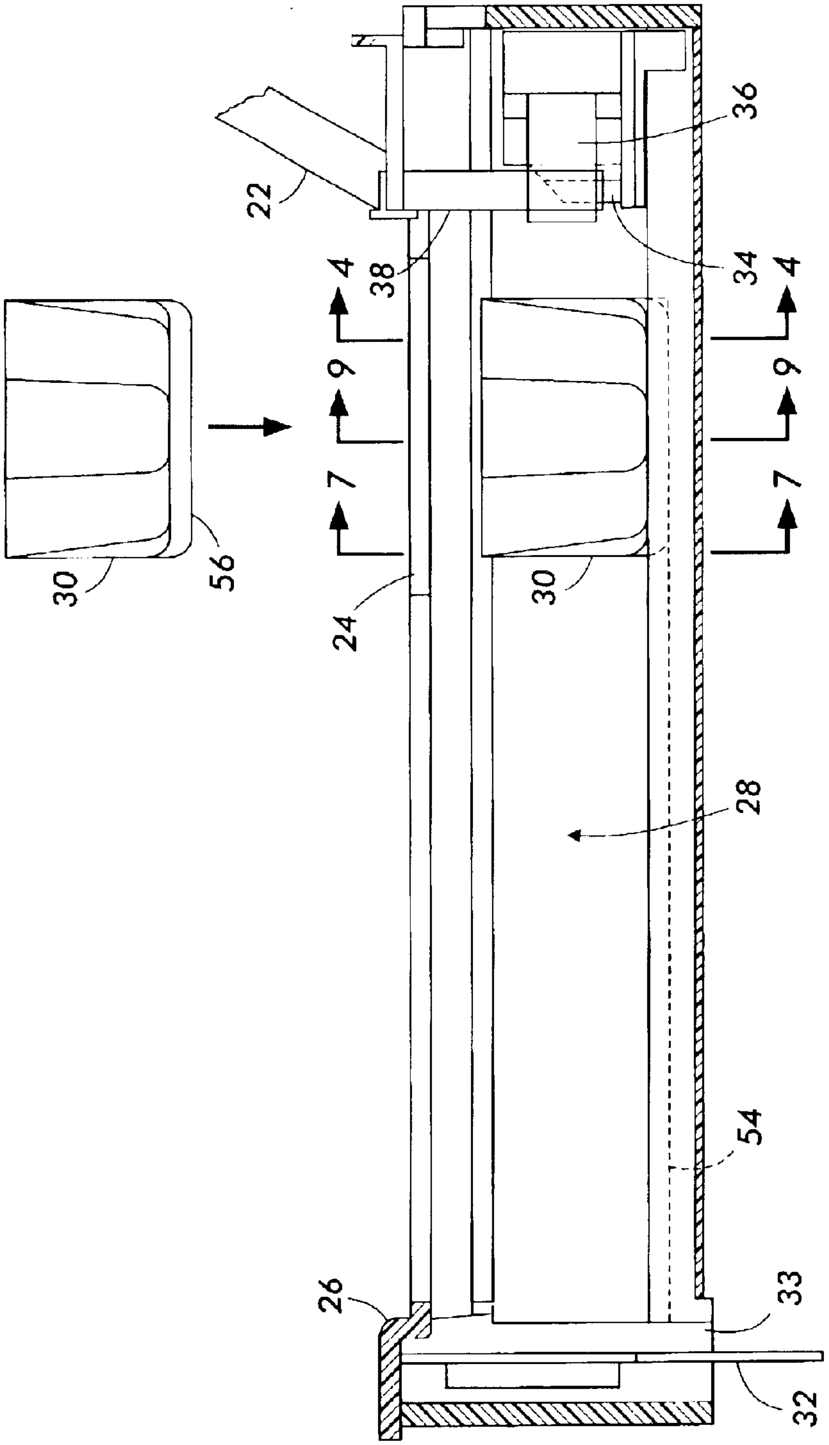
FIG. 3 is a side sectional view of a feed channel of a solid ink feed system taken along line 3—3 of FIG. 2.

As seen in FIG. 3, each feed channel 28 delivers ink sticks 30 of one particular type or color to a corresponding melt plate 32. Each feed channel has a longitudinal feed direction from the insertion end of the feed channel (near the key plate opening) to the melt end of the feed channel. The melt end of the feed channel is adjacent the melt plate 32. The melt plate melts the solid ink stick into a liquid form. The melted ink drips through a gap 33 between the melt end of the feed channel and the melt plate, and into a liquid ink reservoir (not shown). The feed channels 28 have longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. In a manner similar to that described in copending U.S. patent application Ser. No. 10/159,883, filed on May 30, 2002, entitled "Load and Feed Apparatus for Solid Ink," by Brent R. Jones, the ink load linkage 22 is attached to the push block 34 by a yoke 38. The yoke 38 extends through an elongate opening 25 in the key plate. When the ink load linkage is raised to reveal the key plate 26, the attachment to the ink load linkage 22 pulls the push block 34 toward the insertion end of the feed channel. In the implementation illustrated, the constant force spring 36 can be a flat spring with is face oriented along a substantially vertical axis.

Figure 4:
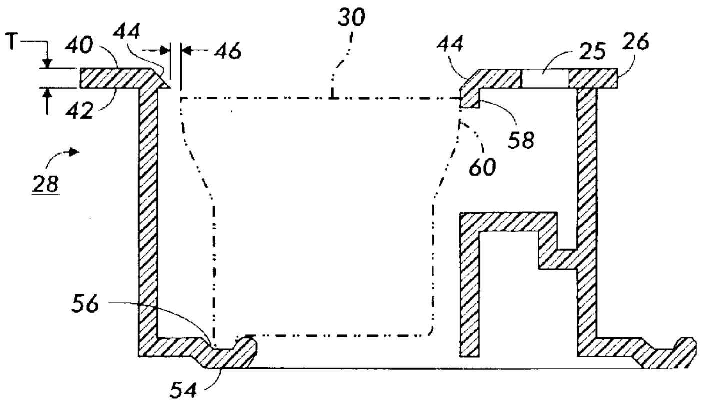
FIG. 4 is a simplified cross-sectional view of a feed channel taken along line 4—4 of FIG. 3.

Referring now to FIG. 4, an exemplary ink stick feed channel 28 includes the feed channel guide rail 54 that interacts with an ink stick guide element 56 formed in the lower portion of the ink stick body to guide the ink stick 30 along the length of the feed channel 28. An upper feed channel guide rail 58 slidingly engages an upper side edge 60 of the ink stick 30, to balance and guide the ink stick along the length of the feed channel 28. The upper feed channel guide rail can be formed as part of the key plate 26 that covers the feed channel, or as a part of the feed channel body.

A color printer typically uses four colors of ink (yellow, cyan, magenta, and black). Ink sticks 30 of each color are delivered through a corresponding individual one of the feed channels 28. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The keyed openings 24 through the key plate 26 aid the printer user in ensuring that only ink sticks of the proper color are inserted into each feed channel. Each keyed opening 24 of the key plate has a unique perimeter shape. The ink sticks 30 of the color for that feed channel have a perimeter shape corresponding to the shape of the keyed opening. In particular, the ink stick and the keyed opening have substantially identical perimeter shapes, so that the keyed openings and corresponding ink stick shapes exclude from each ink feed channel ink sticks of all colors except the ink sticks of the proper color for that feed channel.

As shown in FIG. 4, the key plate 26 has an outer major surface 40 and an inner major surface 42, separated by a thickness T. The perimeter of the keyed key plate opening 24 in the key plate 26 has a chamfered edge 44 across this thickness T to guide the ink stick 30 into the feed chute 28. The shaped key plate opening 24 has substantially the same perimeter shape through both major surfaces of the key plate 26, but with a larger perimeter shape at the outer major surface 40 than at the inner major surface 42.

The perimeter of the chamfered key plate opening 24 at the outer major surface 40 is substantially the same shape as the perimeter shape of the ink stick to be inserted, but enlarged to easily guide the shaped ink stick 30 into the opening. The chamfered edge 44 narrows the perimeter of the opening 24 so that at the inner major surface of 42 the key plate, the opening 24 is closer to the size of the ink stick 30. The perimeter shape of the key plate opening 24 at the outer major surface 40 is substantially concentric with the perimeter shape of the key plate opening at the inner major surface 42. The amount of clearance in the gap 46 between the ink stick 30 and the edge of each opening 24 at the inner major surface of the key plate can thus be minimized to complement the various shapes selected to differentiate between the various color ink sticks. The chamfer of the edge 44 is usually between 7.5 to 30 degrees relative to vertical, but preferably about 15 degrees (with "vertical" as the direction perpendicular to the major surfaces 40, 42 of the key plate 26). The thickness T of the key plate 26 is preferably at least 2.5 mm.

Figure 5:
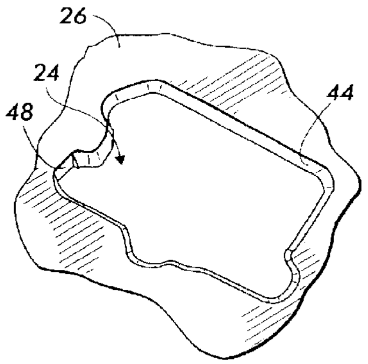
FIG. 5 is a top perspective view of a key plate opening.
Figure 6:
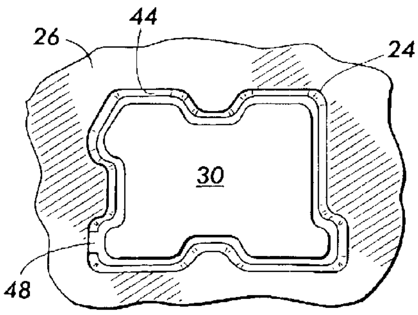
FIG. 6 is a top view of the key plate opening shown in FIG. 5, with an ink stick inserted.
Figure 7:
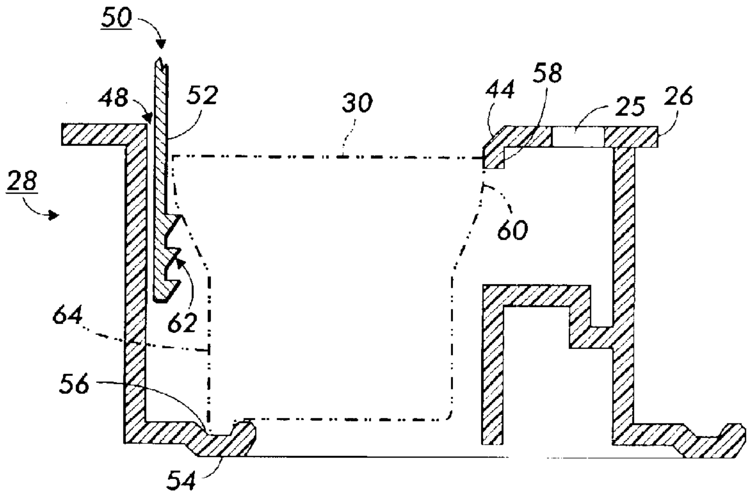
FIG. 7 is a simplified cross-sectional view of a feed channel taken along line 7—7 of FIG. 3 with the key plate opening of FIGS. 5 and 6.

As shown in FIGS. 5, 6 and 7, a clearance area 48 provides access between a section of the ink stick 30 and the key plate opening 24 to permit removal of the ink stick from the feed channel through the key plate opening 24. The clearance area has an area that is small relative to either the area encompassed by the key plate opening, or the area encompassed by the perimeter of the ink stick (which may be the same as the area of the top surface of the ink stick). For example, the area of the clearance area is less than ⅛ (12.5%) of the area of the top surface of the ink stick.

In one example illustrated, the key plate opening 24 has an outwardly directed clearance area 48 in at least one section of the opening perimeter. In this example, this outwardly directed clearance area 48 is formed in a keyed opening having a chamfered edge 44 around most of the perimeter of the keyed opening, except for one or more sections of the key plate opening perimeter having a non-chamfered straight edge. The chamfered edge 44 of the key plate opening perimeter forms at least a majority of the perimeter of the key plate opening 24. The outwardly directed clearance area 48 forms a small portion of the perimeter of the opening 24.

The non-chamfered or straight edge forming the clearance area 48 has an angle of 0 degrees relative to vertical (or nearly 0 degrees allowing for some manufacturing draft angle or tolerances), so that it is substantially perpendicular to the outer major surface 40 and the inner major surface 42 of the key plate 26. The enlarged perimeter of the opening 24 at the outer major surface 40 of the key plate 26 in the section forming the clearance area 48 thus coincides with the perimeter of the opening 24 at the inner major surface 42 of the key plate 26 at that section of the key plate opening. The clearance area formed with the non-chamfered edge in the section of the key plate opening perimeter at the inner major surface 42 of the key plate 26 provides a clearance for an ink stick removal tool.

Another portion of the access means for removing the ink stick from the feed channel through the key plate opening 24 is an ink stick removal tool. An exemplary ink stick removal tool 50 having a single leg 52 is shown in FIG. 7. In an example, the removal tool leg 52 is substantially straight. The removal tool leg 52 is inserted into the clearance area 48 between the ink stick 30 and the non-chamfered edge section of the opening 24. In an exemplary implementation, the clearance area 48 is in a section of the key plate opening perimeter that is on the opposite side of the key plate opening from the upper guide rail 58.

To remove an ink stick from the feed channel, the ink stick is positioned in the feed channel directly beneath the key plate opening so that the ink stick is vertically aligned with the key plate opening. The leg 52 of the ink stick removal tool is inserted through the clearance area until a portion of the removal tool leg, at or near its distal end, is adjacent a portion of the ink stick. In an example, the distal end of the leg is adjacent a side surface 64 of the ink stick. The inner surface 62 of the removal tool leg 52, at or near the distal end of the leg, is pressed against the side surface 64 of the ink stick 30, pressing the upper edge 60 of the opposite side of the ink stick against another surface, such as the upper feed channel guide rail 58. The distal end of the ink stick removal tool leg 52 is configured to engage a portion of the ink stick. For example, the inner surface 62 of the removal tool leg can be roughened to provide enhanced frictional engagement with the ink stick 30. As the operator pulls upward on the ink stick removal tool, the inner surface 62 of the removal tool leg frictionally engages the ink stick, so that the ink stick 30 can be lifted through the key plate opening 24. The upper feed channel guide rail 58 has a low friction surface. As the operator lifts the removal tool with its leg frictionally engaging the side of the ink stick, the opposite side of the ink stick tends to slide against the surface of the upper feed channel guide rail. The operator need not lift the ink stick entirely through the key plate opening 24 using the removal tool 50. The operator need use the removal tool to lift the ink stick only until a sufficient amount of the ink stick is exposed above the key plate 26 that the operator can grasp the exposed portion with the operator's fingers, or with another tool.

Figure 8:
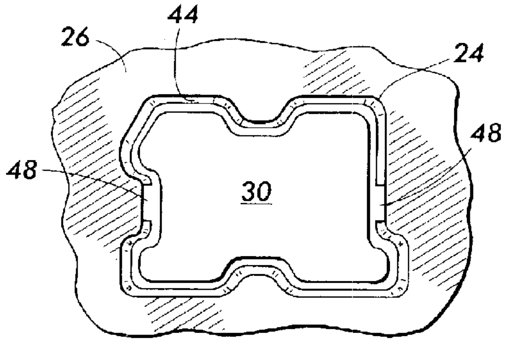
FIG. 8 is a top view of a different key plate opening, with an ink stick inserted.
Figure 9:
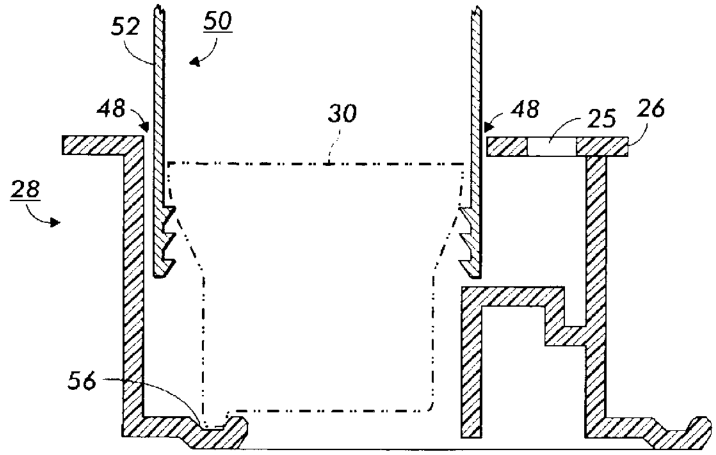
FIG. 9 is a simplified cross-sectional view of a feed channel taken along line 9—9 of FIG. 3 with the different key plate opening of FIG. 8.

In another example shown in FIGS. 8 and 9, multiple clearance areas 48 are provided in the perimeter of the key plate opening 24. With a key plate opening 24 having a chamfered edge 44, each clearance area is formed by providing a section of the perimeter of the key plate opening with a non-chamfered straight edge. In the particular example shown, two clearance areas are formed, one each on opposite sides of the key plate opening. Such an arrangement allows use of an ink stick removal tool 50 having two elongate portions or legs 52. One leg of the removal tool is inserted into each clearance area. The legs are pressed toward one another so that they grip the ink stick between them, at or near the distal ends of the legs. With an adequate grip of the ink stick between the legs of the removal tool, lifting the removal tool lifts the ink stick through the key plate opening 24. A small section of the upper feed channel rail 58 (see FIG. 4) may be omitted to accommodate the second clearance area in feed channels that have such an upper feed channel guide rail. The two legs 52 of the removal tool may be separate elements that the operator manipulates separately, or they may be joined at their proximal ends (opposite the distal ends). After considering the following material, those skilled in the art will recognize appropriate arrangements for either joining the two legs, or having them separate.

Figure 10:
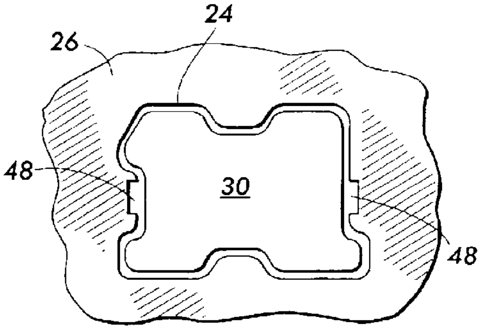
FIG. 10 is a top view of a different key plate opening, with an ink stick inserted.

In some instances, the perimeter edge of the key plate opening 24 is formed with a straight (non-chamfered) edge around the entire perimeter. In such an instance, as illustrated in FIG. 10, one or more clearance areas are provided by outwardly projecting relief areas, each in a section of the perimeter of the key plate opening. In most such instances, the sections of the perimeter forming the clearance areas are small relative to the perimeter, to minimize the impact of the clearance areas on the keying function provided by the perimeter shape of the key plate opening 24. The perimeter shape of the ink stick itself does not include projections corresponding to the clearance areas. Although FIGS. 6, 8, and 10 show rectangular clearance areas, after reading the present description, those skilled in the art will recognize that the clearance areas can be provided with other shapes. For example, the clearance areas may be triangular or semi-circular. The cross section of the legs 52 of the removal tool (see FIGS. 7 and 9) can be shaped to match the shape of the clearance areas 48.

Figure 11:
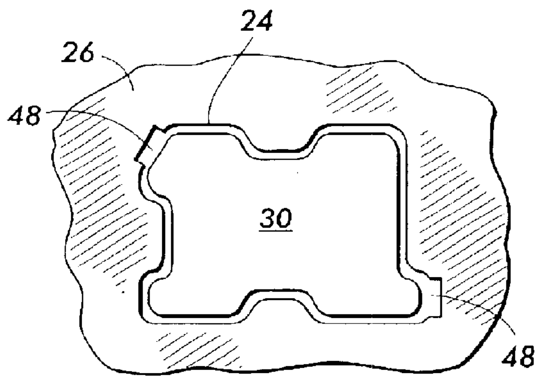
FIG. 11 is a top view of yet a different key plate opening, with an ink stick inserted.

In another example shown in FIG. 11, the clearance areas 48 providing access between the ink stick and the key plate opening need not be positioned directly opposite one another. In the example shown, the clearance areas are positioned diagonally opposite one another. However, other combinations of positions can also be used.

Figure 12:
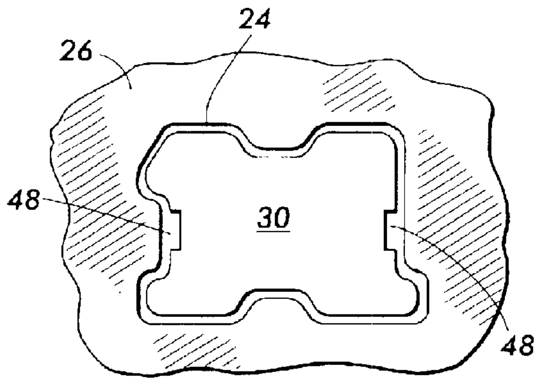
FIG. 12 is a top view of a different key plate opening, with a different ink stick inserted.

In yet another example shown in FIG. 12, the clearance areas 48 that provide access between the ink stick and the key plate opening can be formed by indentations in the lateral perimeter shape of the ink stick body. Although an example having two clearance areas directly opposite one another, those skilled in the art will, after studying the present disclosure, recognize that other positions of the clearance areas can be used. In addition, different numbers of clearance areas (such as one) can also be used.

Ink sticks have different shapes, and the distal ends of the legs 52 of the ink stick removal tool can have different shapes for engaging the ink stick. FIGS. 13–17 show simplified exemplary feed channels 28 with substantially flat bottom surfaces on which substantially block-shaped ink sticks pass. Those skilled in the art will recognize that various shapes of ink sticks and feed channels exist and can be devised, and that the principles described can be applied to ink stick feed channels and ink sticks with different shapes than those shown here.

FIGS. 13 and 14 show two exemplary configurations for the distal end of a single leg of an ink stick removal tool. FIG. 13 shows a removal tool leg in which the inner surface of the removal tool leg 52 has a roughened surface formed by protrusions such as ridges 66 to grip the side surface of the ink stick. In one example, each protrusion has an angled face 68 directed toward the distal end of the removal tool leg, and a straight face 69, substantially perpendicular to the removal tool leg. The roughened surface of the removal tool leg can also be formed with multiple bumps projecting from the surface of the removal tool leg, by raised lines, or by indented scoring on the leg surface. In yet another example, grit or other roughening material can be applied to the inner surface of the removal tool leg in lieu of the protrusions 66.

The ink stick removal tool 50 implementation shown in FIG. 14 includes a projection or foot 70 at the distal end of the removal tool leg 52. When the removal tool leg is inserted through the clearance area 48 in the perimeter of the key plate opening 24 into the feed channel 28, the foot 70 engages the edge of the bottom surface of the ink stick. The operator then lifts the removal tool to raise the ink stick through the key plate opening.

Using the single leg removal tool shown in either FIG. 13 or FIG. 14, after the operator inserts the leg 52 of the removal tool through the clearance area 48 and engages the ink stick, the operator pulls upward on the removal tool. Leverage causes the opposite side of the ink stick to engage another surface, such as a surface of the ink stick feed system. For example, the opposite side of the ink stick slidingly engages the upper feed channel guide rail 58. As noted above, the operator need not lift the ink stick entirely through the key plate opening 24 using the removal tool 50. The operator need use the removal tool to lift the ink stick only until a sufficient amount of the ink stick is exposed above the key plate 26 that the operator can grasp the exposed portion with the operator's fingers, or with another tool.

Examples of using ink stick removal tools with multiple legs are shown in FIGS. 15 and 16. Such multiple legged removal tools are used with a key plate having a clearance area in each of multiple sections of the perimeter of the key plate opening. For example, a removal tool with two legs 52 is used with a key plate opening having at least two clearance areas in the perimeter of the key plate opening. In the examples illustrated in FIGS. 15 and 16, the clearance areas in the perimeter of the key plate opening are on opposite sides of the key plate opening. Such positioning permits the two legs, when inserted through the clearance areas and into the feed channel 28 to be pressed toward one another to grip the ink stick 30 between them. In particular, the clearance areas are directly opposite one another across the key plate opening 24. The distal ends of the legs 52 are provided with elements for engaging the ink stick, such as protrusions 66 (FIG. 13) or a perpendicular foot 70 (FIG. 16). When the user engages one of the removal tool legs against one side of the ink stick, another side of the ink stick engages the other removal tool leg.

Figure 17:
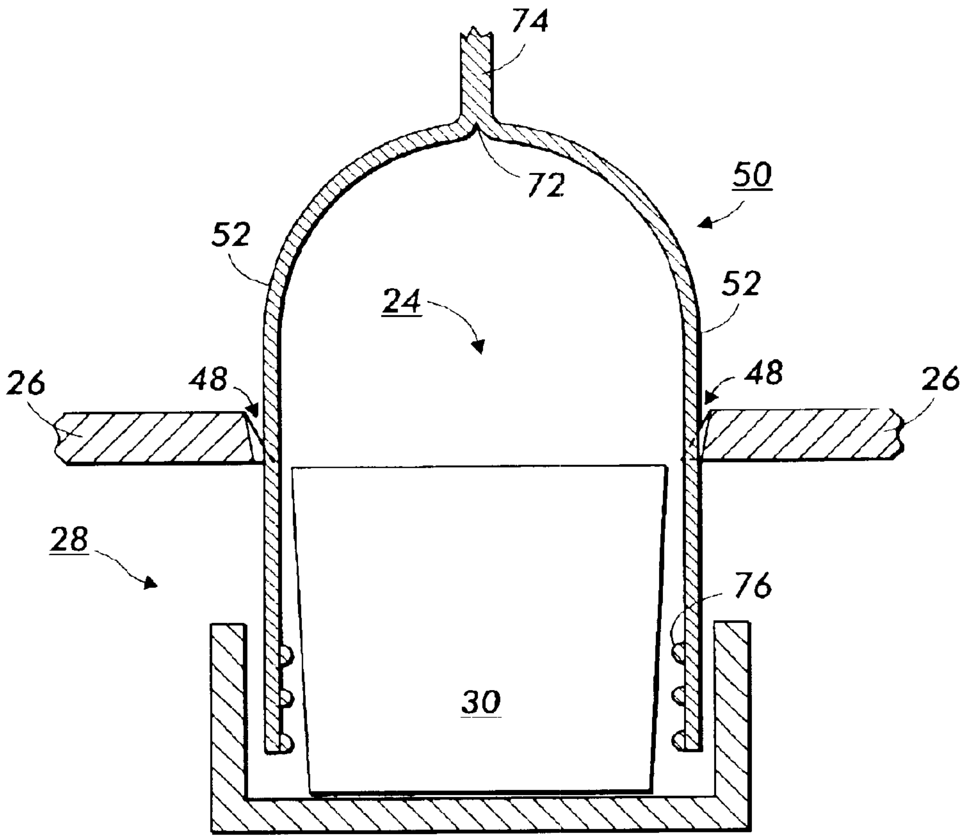
FIG. 17 is a simplified cross-sectional view of a feed channel showing an ink stick and yet a different embodiment of an ink stick removal tool present.

Multiple legged implementations of the ink stick removal tool 50 (FIGS. 9, 15, and 16) can have separate legs 52 that are separately and independently manipulated at their proximal ends by the operator. Alternatively, the proximal ends of the legs 52 are joined together to provide a unitary removal tool that the operator can easily manipulate with one hand. An example of joined removal tool legs 52 is shown in FIG. 17. The proximal ends of the legs 52 are shaped toward one another and joined together at a connection 72. In one example, the legs 52 are curved toward one another and merged into a common trunk 74. The trunk 74 and legs 52 are formed of a resilient rigid material, such as a metal or a rigid plastic, so that the legs can be pressed toward one another to grip the ink stick. When the operator applies pressure to the outer surfaces of the legs 52, the distal ends of the legs move toward one another. Ideally, when the operator releases the pressure from the outer surfaces of the legs, the distal ends of the legs return to their original positions, releasing the ink stick. After studying the present description, those skilled in the art will recognize that other mechanisms are available to join and manipulate the legs of the removal tool. For example, the connection between the legs may be a mechanical connection such as a hinge. In addition, mechanical mechanisms can be used to move the legs toward and/or away from one another. For example, a mechanical clamp may be incorporated to selectively apply pressure to the outer surfaces of the legs, or a mechanism placed between the legs may draw the legs toward one another. Yet another example of a gripping mechanism for the distal end of each leg is shown in FIG. 17. Rounded bumps 76 on the inner surface of the distal ends of the legs help to grip the ink stick when the legs 52 are pressed against the ink stick The ink stick removal tool 50 can have more than two legs, as shown in the example of FIG. 18. This exemplary ink stick removal tool has 3 legs 52 attached to an upper T-frame trunk 75. A first leg is opposite a second leg to grip opposite sides of an ink stick. A third leg is oriented to engage a surface of the ink stick perpendicular to the sides gripped by the first and second legs. The legs fit through clearance areas between the ink stick and the perimeter of the key plate opening to surround the ink stick. Those skilled in the art recognize that some ink sticks have perimeter shapes that are significantly non-rectangular. For example, the perimeter shape may be triangular, circular, or some other shape. Multiple legged removal tools for such non-rectangular ink sticks may have legs arranged to accommodate the perimeter shape of the ink stick. For example, a removal tool for a triangular or circular ink stick may have three legs arranged at 120-degree intervals. After reading the present descriptions, those skilled in the art will identify arrangements appropriate for other ink stick shapes.

Ink sticks can also be removed from the feed channel 28 through the key plate opening 24 by inserting the distal end of a removal tool leg 52 into the ink stick so that there is sufficient frictional engagement between the removal tool leg and the ink stick that when the removal tool is lifted, the ink stick rises with the removal tool leg. Referring, for example, to FIG. 19, a removal tool 50 may have a single leg 52 provided with a pointed distal end, so that pressing the removal tool longitudinally against the top surface of the ink stick 30 causes the removal tool leg to penetrate the ink stick. The ink stick 30 may include a relief area for receiving and engaging the ink stick removal tool. For example, a small blind cavity or through cavity or hole can be included in the ink stick to facilitate ink stick removal by serving as a friction engagement feature for the top surface penetration removal tool. The cavity can extend through at least one surface of the ink stick body. The cavity may extend through only a portion of the ink stick body, or it can extend through the entire thickness of the ink stick body. In an alternative, the cavity may be a void entirely internal to the ink stick body, not extending through any of the surfaces of the ink stick. Operator instructions may inform the machine operator into which portion of the ink stick body the removal tool should be inserted. Or, a score or other surface marking on the surface of the ink stick may identify the location of the internal void. Surface roughening elements, such as grit, scoring, or projections on the surface of the distal end of the removal tool leg provide additional friction between the removal tool engagement surface and the ink stick. The projections may completely encircle the removal tool leg, or they may encompass only a portion of the circumference of the removal tool leg. In addition, spiral projections 78 along the removal tool leg allow the operator to screw the removal tool leg 52 into the ink stick. After the operator has inserted the removal tool leg into the ink stick, the operator lifts the removal tool upward. The frictional engagement between the removal tool leg and the ink stick causes the ink stick to rise with the removal tool. The removal tool leg 52 may have any of several cross-sectional shapes, including circular, rectangular, square, triangular, etc.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the following claims.

I claim:

1. A key plate assembly for an ink stick feed system for a phase change ink jet printer, the key plate assembly comprising:

a key plate having first and second major surfaces separated by a key plate thickness;

at least one key plate opening through the key plate; wherein:

the key plate opening has a first perimeter shape at the first major surface;

the key plate opening has an enlarged first perimeter shape at the second major surface, concentric with the first perimeter shape at the first major surface;

at least one section of the key plate opening at the first major surface has an outwardly directed clearance area; and a removal tool having at least one leg, wherein the cross section of the removal tool leg is smaller than the clearance area.

2. The key plate assembly of claim 1, wherein the enlarged first perimeter shape does not contain a shape corresponding to the clearance area.

3. The key plate assembly of claim 2, wherein the key plate is chamfered across the thickness between the first and second major surfaces, except at the clearance area.

4. A key plate assembly for an ink stick feed system for a phase change ink jet printer, the key plate assembly comprising:

a key plate substantially covering at least a portion of the channel;

wherein the key plate has a key plate opening through the key plate to permit ink sticks having a first perimeter shape to pass through the key plate; and wherein the key plate opening has substantially the first perimeter shape, except that at least one section of the key plate opening has an outwardly directed clearance area; and additionally comprising a removal tool having at least one leg, wherein the cross section of the removal tool leg is smaller than the clearance area.

5. The key plate assembly of claim 4, wherein the removal tool leg has a proximal end and a distal end, and the distal end comprises engaging means for engaging a portion of an ink stick.

6. The key plate assembly of claim 5, wherein the engaging means comprises an angled foot at the distal end of the removal tool leg.

7. The key plate assembly of claim 5, wherein the engaging means comprises a roughened surface of the removal tool leg adjacent the distal end of the removal tool leg.

8. The key plate assembly of claim 7, wherein the roughened surface of the removal tool leg is scored.

9. The key plate assembly of claim 7, wherein the roughened surface of the removal tool leg comprises friction ridges.

10. An ink stick feed system for an ink printer including an ink delivery channel, the ink stick feed system comprising:

an ink stick having an ink stick perimeter shape;

a key plate substantially covering at least a portion of the ink delivery channel, wherein the key plate includes a key plate opening having a key plate opening shape for receiving an ink stick having the ink stick perimeter shape through the key plate into the ink delivery channel; and access means for providing access between the key plate opening and the ink stick for removing the ink stick from the ink delivery channel through the key plate opening;

wherein the access means comprises a clearance area between the key plate opening and the ink stick when the key plate opening receives the ink stick;

wherein the clearance area has an area that is less than ⅛ the area encompassed by the ink stick perimeter shape;

wherein the clearance area comprises an inwardly directed relief area formed in the ink stick perimeter shape;

wherein the key plate opening shape is substantially the same as the ink stick perimeter shape, except at the inwardly directed relief area; and wherein the access means additionally comprises a removal tool having at least one leg, wherein the cross section of the removal tool leg is smaller than the relief area.

11. The ink stick feed system of claim 10, wherein the removal tool leg has a proximal end and a distal end, and the removal tool leg adjacent the distal end of the removal tool leg is configured to engage a portion of the ink stick.

12. A method of removing an ink stick having a perimeter shape from an ink feed channel of an ink delivery system of a phase change ink printer, wherein the feed channel is substantially covered by a key plate, the method comprising:

positioning the ink stick in the ink feed channel adjacent a keyed opening through the key plate, wherein the keyed opening has a perimeter shape substantially similar to the perimeter shape of the ink stick;

inserting a removal tool through a clearance area between the ink stick and the perimeter of the keyed opening, until the removal tool is along a side of the ink stick;

engaging the removal tool against a portion of the ink stick; and removing the removal tool from the clearance area while continuing to engage the removal tool against the ink stick.

13. The method of claim 12, wherein engaging the removal tool against a portion of the ink stick presses an opposite side of the ink stick against a first surface.

14. The method of claim 12, wherein the first surface is a surface of the ink delivery system.

15. The method of claim 12, wherein the first surface is another portion of the removal tool.

16. The method of claim 15, wherein inserting the removal tool through the clearance area comprises inserting a first portion of the removal tool through a first clearance area between the ink stick and the perimeter of the keyed opening, and the method additionally comprises:

inserting a second portion of the removal tool through a second clearance area between the ink stick and the perimeter of the keyed opening until the second portion of the removal tool is along a different side of the ink stick;

engaging the second portion of the removal tool against a second portion of the ink stick; and removing the second portion of the removal tool from the clearance area while continuing to engage the second portion of the removal tool against the second portion of the ink stick.

* * * * *